US008423313B2

(12) United States Patent
Lohmann

(10) Patent No.: US 8,423,313 B2
(45) Date of Patent: Apr. 16, 2013

(54) METHOD AND APPARATUS FOR TESTING VALVE CONTROL SYSTEM

(75) Inventor: Jürgen Lohmann, Hamburg (DE)

(73) Assignee: Airbus Operations GmbH (DE)

( * ) Notice: Subject to any disclaimer, the term of this patent is extended or adjusted under 35 U.S.C. 154(b) by 215 days.

(21) Appl. No.: 12/743,653

(22) PCT Filed: Nov. 29, 2007

(86) PCT No.: PCT/EP2007/010383
§ 371 (c)(1),
(2), (4) Date: Aug. 24, 2010

(87) PCT Pub. No.: WO2009/068069
PCT Pub. Date: Jun. 4, 2009

(65) Prior Publication Data
US 2010/0324840 A1    Dec. 23, 2010

(51) Int. Cl.
*G01L 25/00* (2006.01)
*F16K 31/02* (2006.01)
*G05D 7/00* (2006.01)

(52) U.S. Cl.
USPC .................. 702/114; 251/129.01; 700/282

(58) Field of Classification Search ............ 702/114, 702/33, 45, 47, 50–51, 81, 84, 108, 113, 702/127, 138, 140, 182–183, 188–189; 73/1.57, 73/1.71–1.73, 40, 700; 251/12, 21, 30.5, 251/33, 58, 82, 89, 89.5, 129.01, 129.19, 251/149, 149.8–149.9, 175, 187, 213, 215, 251/289–291, 293–298, 339–341, 349; 700/1, 700/9, 17–21, 28, 39, 275, 281–282
See application file for complete search history.

(56) References Cited

U.S. PATENT DOCUMENTS

| 3,764,814 A | 10/1973 | Griffith |
| 5,617,039 A | 4/1997 | Kuck et al. |
| 2007/0255515 A1* | 11/2007 | Hoehner et al. ................ 702/51 |

FOREIGN PATENT DOCUMENTS

CN    2139538 Y    8/1993
(Continued)

OTHER PUBLICATIONS

English Translation of Decision to Grant dated Nov. 8, 2011, for parallel Russian Patent Application No. 2010122496/11(031996), filed Nov. 29, 2007 (4 pages).
PCT International Search Report for PCT/EP2007/010383 issued by the EP Searching Authority on Aug. 11, 2008.

(Continued)

*Primary Examiner* — Toan Le
(74) *Attorney, Agent, or Firm* — Barnes & Thornburg LLP

(57) ABSTRACT

A method and apparatus are disclosed for testing a valve control system in an aircraft fuel supply system having a plurality of control valves, wherein the control system includes relay means for outputting control signals to each of the plurality of control valves. The method includes providing connection means for electrically connecting a test device to the control system relay means, connecting a test device to the relay means such that the test device is adapted to receive control signals output by the control system to any one of the plurality of control valves, detecting an electrical control signal output from the relay means to any one of the plurality of control valves, and identifying the particular one of the plurality of control valves to which a detected control signal is output by the relay means and identifying the nature of the control signal output to that particular control valve.

12 Claims, 6 Drawing Sheets

FOREIGN PATENT DOCUMENTS

| | | |
|---|---|---|
| JP | 08-152077 A | 6/1996 |
| JP | 2003-67035 A | 3/2003 |
| RU | 13426 U1 | 4/2000 |
| RU | 2223532 C2 | 3/2002 |
| WO | 99/21066 A1 | 4/1999 |

OTHER PUBLICATIONS

English translation of Notification of Reasons for Refusal for the parallel Japanese patent application No. 2010-535234 issued on May 1, 2012, by the Japanese Patent Office (2 pages).

* cited by examiner

METHOD AND APPARATUS FOR TESTING VALVE CONTROL SYSTEM

CROSS-REFERENCE TO RELATED APPLICATIONS

This application is a U.S. national counterpart application of international application Serial No. PCT/EP2007/010383 filed Nov. 29, 2007.

FIELD OF THE INVENTION

The present invention relates to a method and apparatus for testing a valve control system in an aircraft fuel supply system.

BACKGROUND OF THE INVENTION

The fuel supply systems of larger commercial aircraft typically incorporate a number of separate fuel tanks, to each of which various refuel/defuel lines, transfer lines, pressurization lines and vent lines are connected. Furthermore, each of these lines associated with the individual fuel tanks is respectively controlled by at least one control valve. Thus, the fuel supply system is a sophisticated arrangement of interconnected tanks and lines and the operation of the multitude of individual valves is typically managed by a computer-regulated valve control system.

Ground tests conducted on an aircraft, e.g. during the assembly or commissioning of a new aircraft, require a series of tests to check whether or not the correct control signals are being output to the actuator motors or servo-motors of the individual control valves in the fuel supply system. The control signals output to the numerous different control valves in the fuel supply system have conventionally been tested manually. This, however, is an extremely laborious and time intensive procedure which leads to longer production times and therefore increased costs.

Accordingly, it is an object of the present invention to provide a method and an apparatus for testing a valve control system in an aircraft fuel supply system which are simpler to implement and are optimized from a time and cost perspective.

SUMMARY OF THE INVENTION

According to one aspect, the present invention provides a method of testing a valve control system in an aircraft fuel supply system having a plurality of control valves, wherein the control system includes relay means for outputting control signals to each of the plurality of control valves, the method comprising the steps of:
  providing connection means for electrically connecting a test device to the control system relay means;
  connecting a test device to the relay means such that the test device is adapted to receive control signals output by the relay means to any one or more of the plurality of control valves;
  detecting an electrical control signal output by the relay means to one of the plurality of control valves; and
  identifying the particular one of the plurality of control valves to which a detected control signal is output by the relay means and/or identifying the nature of the control signal output to that particular control valve. This step of identifying the nature of the detected control signal preferably involves identifying whether the control signal is adapted to open or to close the particular control valve.

In one particular form of the invention, the step of connecting the test device to the relay means involves making a single connection to the relay means, with that connection preferably being made directly at a relay device of the control system. In this way, the test device may be quickly and simply connected with the valve control system relay means in such a manner that the test device is adapted to receive control signals output to any one of the plurality of control valves. In this particular form of the invention, the detecting step involves detecting an electrical control signal output by the relay means to any one of the plurality of control valves.

The invention is thus able to provide a testing method in which all signals output to the control valves from the relay means can be evaluated using a single connection of testing equipment. The method is thus designed to detect and identify any control signal output from the control system to any one of the control valves of the aircraft fuel supply system. This significantly improves upon the conventional method by saving time and effort. Specifically, the user does not have to move testing equipment to different locations and establish new connections at each point. The invention thereby enables the testing to occur much more efficiently by accessing and evaluating all the output signals of the valve control system from a single location at the relay means.

In an alternative form of the invention, the step of connecting the test device to the relay means involves making one or more separate connections to the relay means at a location remote from a relay device of the control system. The one or more connections are preferably made at the control valve connection points.

Typically, each of the plurality of control valves in the fuel system is operated, i.e. moved between an open and closed position, by an actuator motor such as an electric servo-motor. In some aircraft fuel supply systems, however, each of the control valves is adapted to be operated by two or more separate actuator motors in order to achieve better reliability through redundancy. In such cases, the control system is adapted to send control signals to each of the actuator motors of the plurality of control valves. Accordingly, in a preferred form of the invention, the method may further comprise the step of: identifying the particular one of the actuator motors of the particular control valve to which a detected control signal is output by the control system.

The identification of the particular valve or actuator motor to which an output signal of the valve control system is directed and the operative purpose of that signal (i.e. to open or to close the valve) is naturally very important for assessing whether the control system is functioning properly. Thus, this information obtained with the method of the invention needs to be made available to the user. The information may be stored (e.g. digitally) for later retrieval, but it is more preferable if the information is immediately available in a readily usable and appreciable format.

In a preferred form of the invention, therefore, the step of identifying the particular valve and/or the particular actuator motor to which a detected control signal is output, and the step of identifying the nature of the detected control signal, include displaying information corresponding thereto for visual observation by the user. This may involve the use of a display screen, such as an LCD for presenting detailed test information. Alternatively, the information display may comprise a series of light elements, such as light-emitting diodes (LEDs), each of which is connected to detect a particular control signal and labelled accordingly on a display panel. In this way, when a particular LED is illuminated, it immediately indicates or denotes the presence of a particular control signal.

While conducting the testing method of the invention, it may occur that a particular output signal expected from the valve control system is not detected. In such an event, it can be helpful to measure a property of a signal or a signal circuit in an effort to ascertain why the correct signal has not been detected, i.e. during a troubleshooting procedure. In a preferred form of the invention, therefore, the method further comprises the step of: measuring a property of an electrical control signal output by the control system or a property of a signal circuit between the relay means of the control system and one or more of the plurality of control valves. According to another aspect, the present invention provides an apparatus for testing a valve control system in an aircraft fuel supply system having a plurality of control valves, wherein the control system includes relay means for outputting control signals to each of the plurality of control valves, the apparatus comprising:

connector means for connection to the relay means of the control system such that the apparatus is adapted to receive control signals output by the control system to any one or more of the plurality of control valves, detector means for detecting a control signal output by the control system to any one of the plurality of control valves, and indicator means for identifying to which particular one of the plurality of valves a detected control signal is output and/or for identifying the nature of the control signal output to that particular valve. As noted above, the nature of the control signal identified by the indicator means is typically whether the detected control signal is a signal to open or to close the particular control valve.

In some aircraft fuel systems, each of the control valves is operated by two or more independent actuator motors and the control system outputs control signals to each of the actuator motors of the plurality of control valves. Thus, in a preferred form of the invention, the indicator means may be adapted to identify the particular one of the actuator motors of the control valve to which a detected control signal is output from the relay means of the control system.

In a preferred form of the invention, the indicator means includes a visual display for identifying the particular valve and/or the particular actuator motor to which a detected control signal is output, and for identifying the nature of the detected control signal.

For example, the display may comprise a screen device, such as an LCD, for displaying information identifying the valve, the actuator motor and/or the nature of the signal. Alternatively, the visual display may comprises a plurality of light-emitting diodes, with each LED representing one of the control valves, one of the control valve actuator motors and/or an open or close signal nature. In this way, when illuminated, each LED may identify the operational characteristic of a particular control signal output by the relay means of the valve control system.

As mentioned above, to assist with troubleshooting when an expected output signal is not detected, it can be helpful to measure a property of a signal or a signal circuit. In a preferred form of the invention, therefore, the apparatus comprises means for measuring a property of an electrical control signal output by the relay means or of a signal circuit at the relay means or between the relay means and one or more of the plurality of control valves.

The present invention will now be described by way of example with reference to particular embodiments illustrated in the accompanying drawings. It should be understood, however, that the following description of preferred embodiments is not intended to limit the generality of the inventive concept as described above or as defined in the appended claims.

BRIEF DESCRIPTION OF THE DRAWINGS

Preferred embodiments of the invention are hereafter described with reference to the accompanying drawing figures, in which like reference characters designate like features, and in which.

DETAILED DESCRIPTION OF THE PREFERRED EMBODIMENTS

Figure 1:
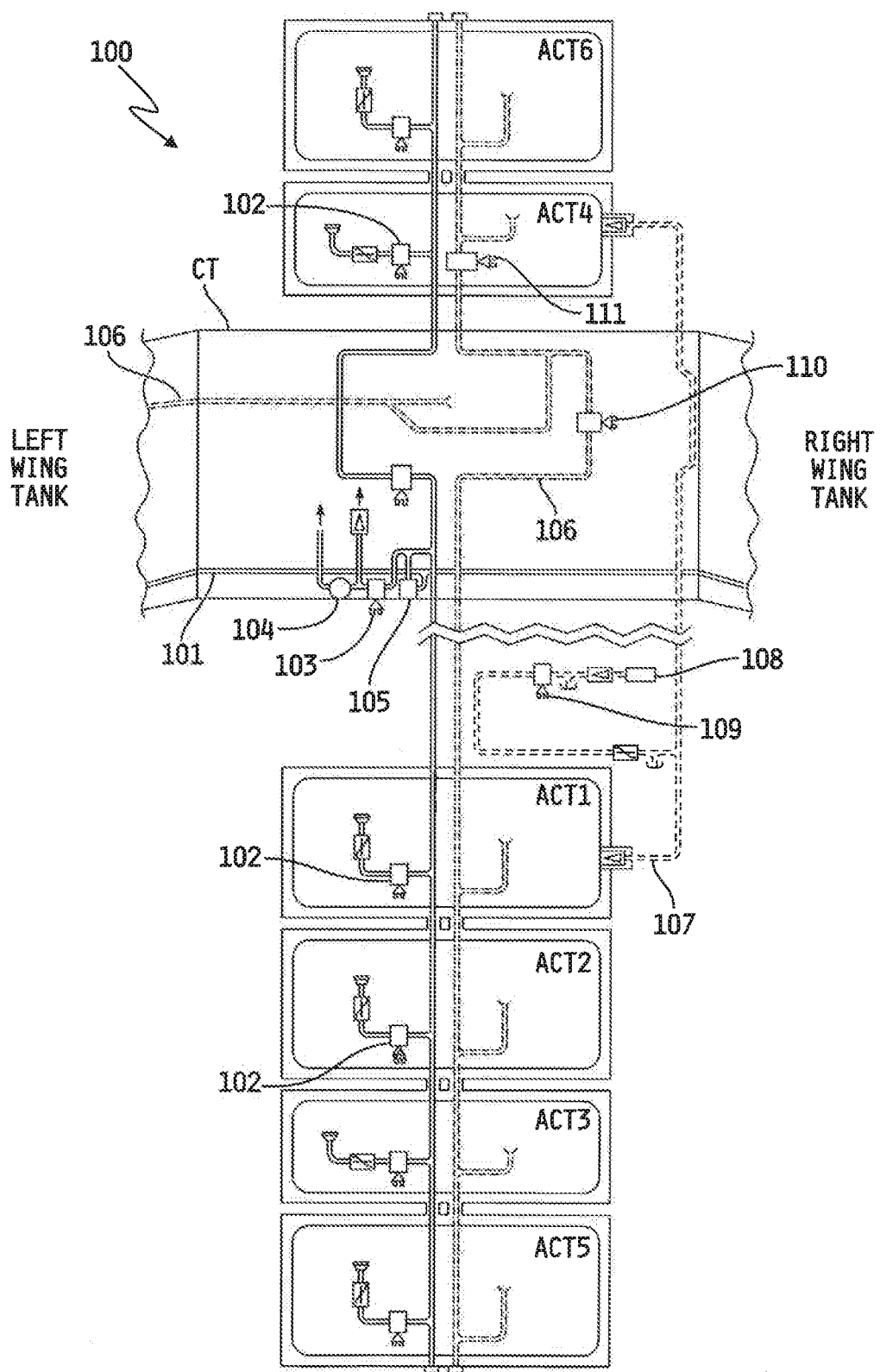
FIG. 1 is a schematic illustration of an Additional Centre Tank (ACT) fuel supply system in a commercial aircraft.

Referring firstly to FIG. 1 of the drawings, an example of an aircraft fuel supply system 100 is illustrated. This particular system is known as the Additional Centre Tank (ACT) system. In the ACT system, six "additional centre tanks" ACT1 to ACT6 are arranged in the cargo area of the aircraft. The ACT system further comprises a main fuel line 101 for conveying fuel into or out of the individual ACTs; for example, when refueling or when transferring fuel between the ACTs and a centre tank CT arranged between the right wing tank and the left wing tank. Accordingly, the ACT system also includes a series of fuel valves, such as fuel inlet valves 102, for each of the six ACTs, a transfer valve 103 for controlling the conveyance of fuel into or out of the individual ACTs via transfer pump 104 and a refuel valve 105 which is opened when the ACT is being refueled. In addition, the ACT system comprises a ventilation system having a vent line 106 as well as a system 107 for providing the ACTs with pressurized air via a pressurized cabin air intake 108. The connection between the ACTs and the pressurized air supply system can be interrupted by means of an air shut-off valve 109. The vent line 106 includes a main vent valve 110 and a forward isolation valve 111.

Furthermore, in the ACT fuel supply system 100, each of the valves (except for the refuel valve 105, which is not so critical) is designed to be separately actuated by two independent electric servo-motors for greater reliability (and therefore safety) via redundancy. Each of the two independent electric servo-motors respectively associated with each control valve are simply referred to herein as Motor 1 (or Mot 1) and Motor 2 (or Mot 2). In view of the complexity of the ACT fuel supply system 100 and the need to ensure precise and consistent operation, the activation (i.e. the opening and closing) of numerous individual valves in the fuel supply system is managed by a computerised valve control system (not shown). This control system includes at least one processor which generates control signals for the valves and a relay device via which the control signals generated by the processor are output to the valve actuator motors. The invention is concerned with testing and evaluating the performance of the valve control system.

Figure 2:
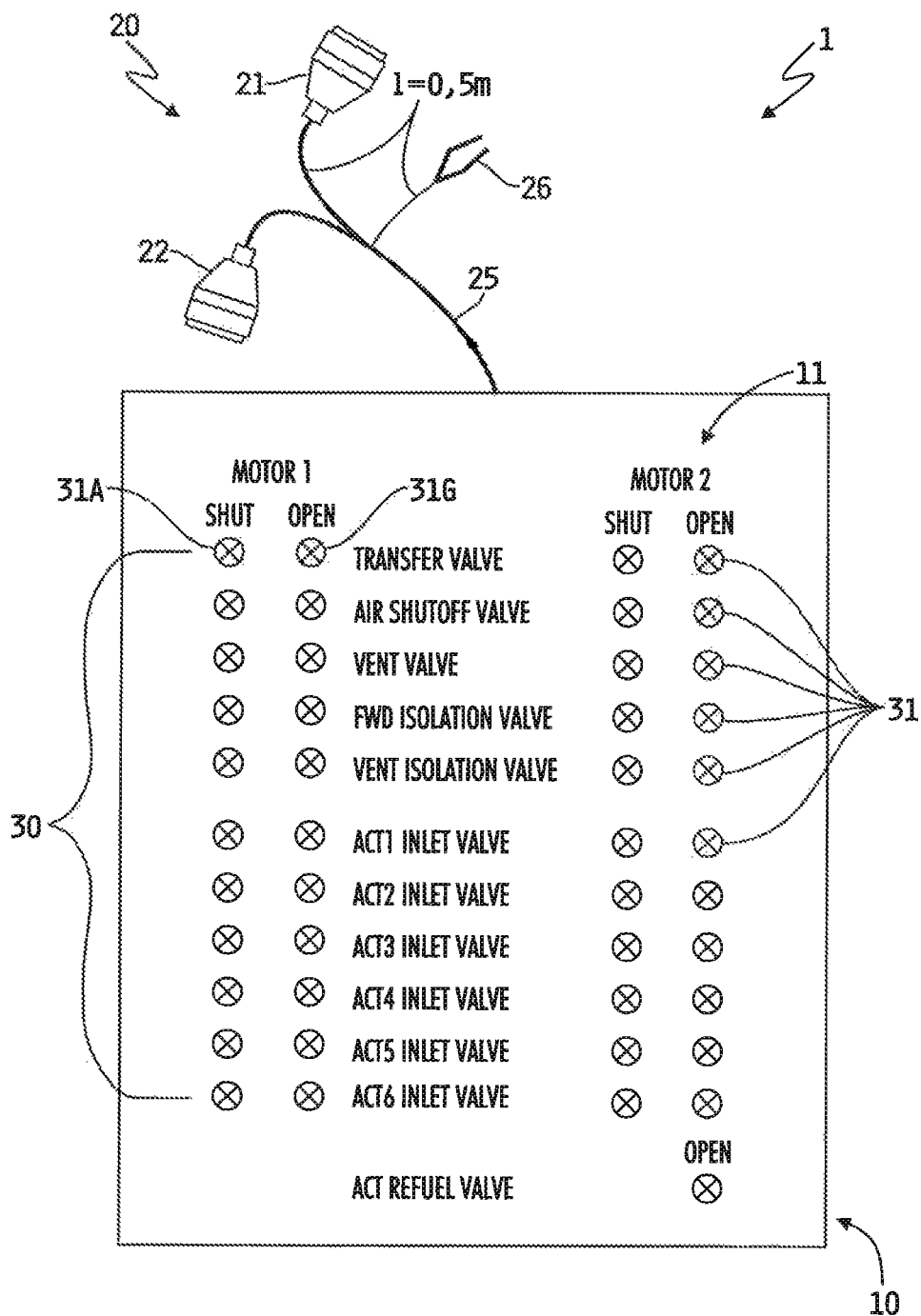
FIG. 2 is a schematic front view of a test apparatus according one embodiment of the invention.

Referring now to FIG. 2 of the drawings, an apparatus 1 according to a first embodiment of the invention is schematically illustrated. The body of the apparatus 1 comprises a generally rectangular casing 10 which houses circuitry and electronic components, and a connector means 20 comprising two connector elements 21, 22 is electrically coupled to the components in the casing 10 by a cable 25. The cable 25 may be provided in any suitable length and, in this case, is approximately 4.5 m. The connector elements 21, 22 are of the plug-in type and are adapted to connect the apparatus 1 directly to a relay device (not shown) of the valve control system from which signals are output for regulating valve operation in the ACT fuel supply system 100. The connector elements 21, 22 provide such a connection with the relay device that the apparatus 1 is adapted to receive control signals output by the control means to the actuator motors (i.e. Motor 1 or Motor 2) of any one of the plurality of control valves 102, 103, 105 etc. In addition, the connector means 20 includes a clip 26, such as an alligator clip, for connection to earth. The earth clip 26 may, for example, be attached to a bonding cable located near the relay device to provide the desired electrical earth.

The casing 10 of the apparatus 1 houses detector means 30 in the form of a collection of light-emitting diodes (LEDs) 31 arranged in separate electrical circuits corresponding to the complete set of possible control signals which may be received from the valve control system. In this way, the LEDs 31 are adapted to detect a control signal output by the control system to any one of the control valve actuator motors. Portions of each LED 31 are visible through or project through an upper face 11 of the casing 10. The upper face 11 of the apparatus casing is furthermore labelled to identify the particular valves of the ACT fuel supply system 100. In particular, the inlet valve 102 for each of the additional center tanks ACT1 to ACT6 is labelled, as are the transfer valve 103, the refuel valve 105 and the air shut-off valve 109, as well as a forward (FWD) isolation valve and two vent valves not shown in FIG. 1. The LED's 31 are arranged in rows, each placed in alignment with the name of the particular valve of the ACT fuel supply system with which its circuit connection in the apparatus 1 associates them.

In particular, except for the refuel valve 105, each of the control valves of the valves of the ACT system 100 has two actuator motors, Motor 1 and Motor 2. Furthermore, each control valve with two independent actuator motors may receive four possible control signals from the valve control system; namely: a signal to Motor 1 to open the valve, a signal to Motor 1 to shut the valve, a signal to Motor 2 to open the valve, and a signal to Motor 2 to shut the valve. Thus, the upper face 11 of the casing 10 is designed to form a display panel for the user which, during use of the apparatus 1, provides immediate information to the user on the signals detected from the valve control system. Considering the "Transfer Valve", which is the first of the valves listed on the front face 11 of the casing 10, it will be seen that two LEDs 31*a*, 31*b* are arranged under the heading "Motor 1" for identifying control signals to the first actuator motor. One of those two LEDs 31*a* is labelled "SHUT" denoting a control signal to Motor 1 to shut or close the transfer valve. The other of those two LEDs 31*b* is labelled "OPEN" denoting a control signal to Motor 1 to open the transfer valve. The same idea applies to the LEDs arranged at the right-hand side of the label "Transfer Valve" under the heading "Motor 2". In that case, the LEDs are arranged and labelled to identify control signals output to the second actuator motor, Motor 2, of the transfer valve. This arrangement is repeated for all of the valves listed having two actuator motors.

Figure 3:
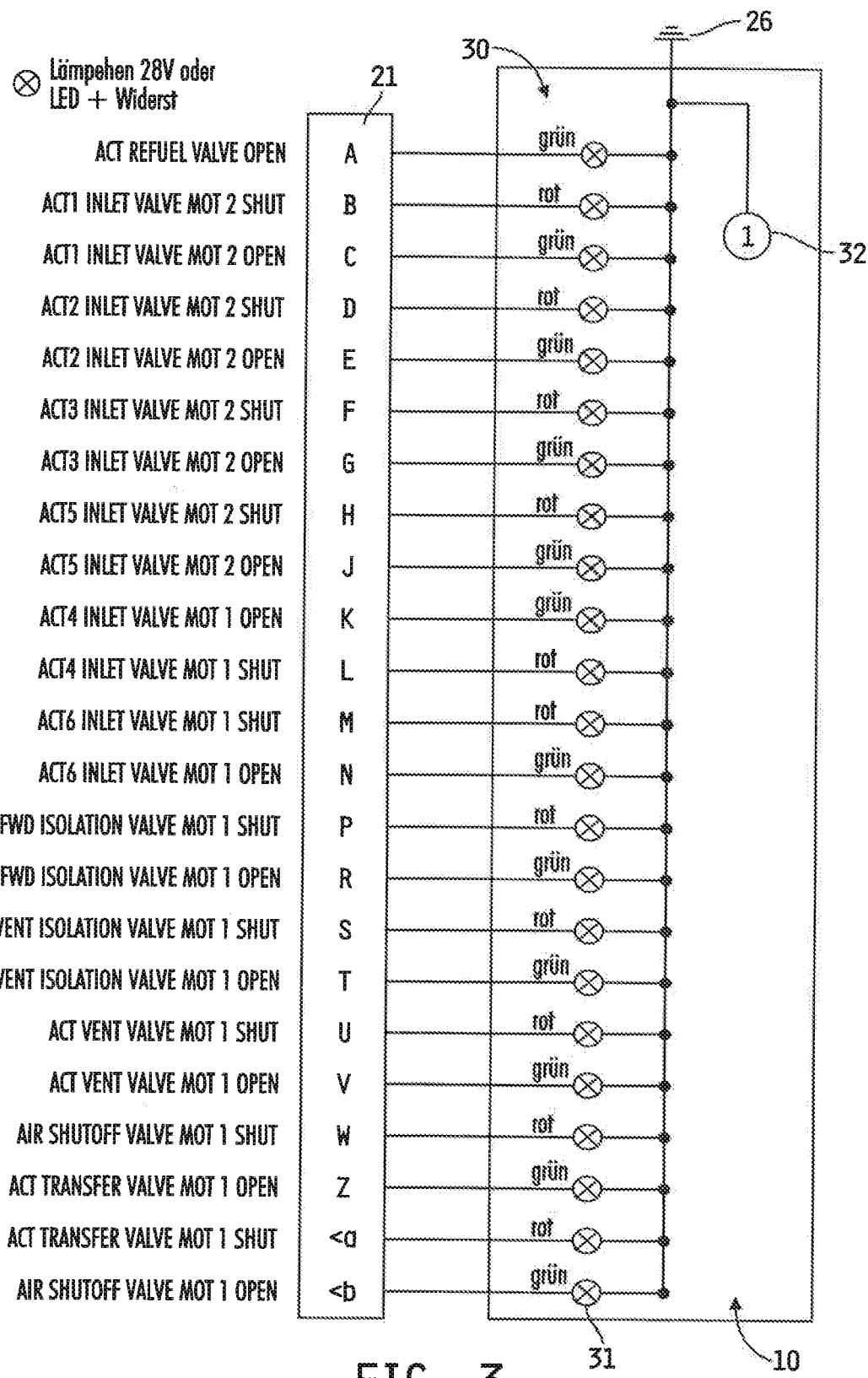
FIG. 3 is a schematic circuit diagram for part of the test apparatus shown in FIG. 2.
Figure 4:
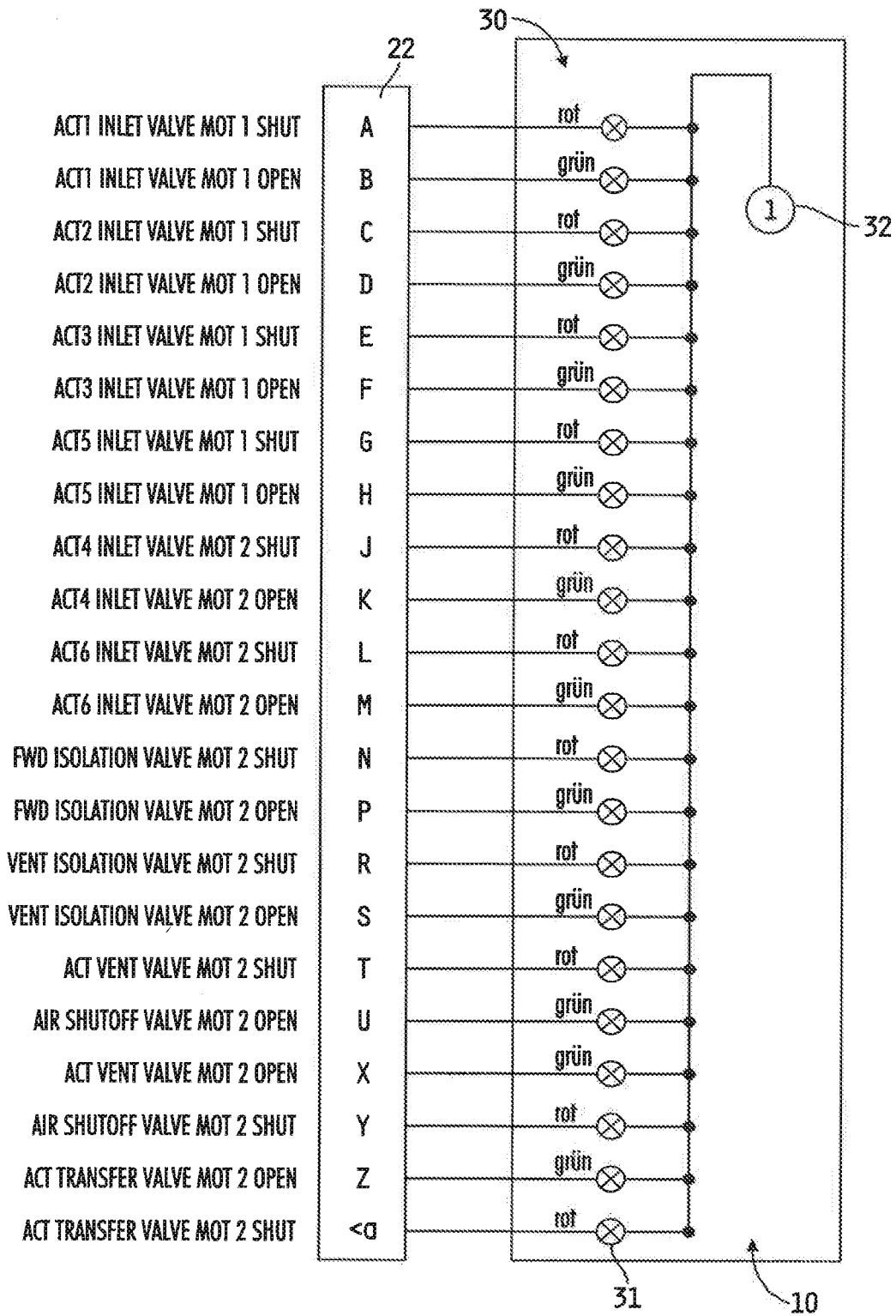
FIG. 4 is a schematic circuit diagram for the other part of the test apparatus shown in drawing FIG. 2.

With reference now to FIGS. 3 and 4 of the drawings, the circuit arrangement of the apparatus 1 is schematically illustrated in two parts. As in FIG. 2, the LEDs 31 are represented in FIG. 3 and FIG. 4 by a crossed circle. The connector 21 is represented at the left-hand side of FIG. 3 and the individual circuits of the connecting element 21 which connect with the relay device to receive particular control signals for particular valve actuator motors are labelled. Similarly, the connector 22 is represented at the left-hand side of FIG. 4 and the individual circuits of the connecting element 22 which connect with the relay device to receive particular control signals for particular valve actuator motors are again labelled. The circuits of FIG. 3 and FIG. 4 connect with one another at the circular connection point 32 containing the numeral "1". In each of these circuit diagrams, it will be noted that the LEDs 31 connected in the circuits for receiving an "OPEN" control signal (i.e. intended to open a valve) are coloured green (i.e. grün) and the LEDs connected in the circuits for receiving a "SHUT" control signal (i.e. intended to shut or close a valve) are coloured red (i.e. rot).

In operation, the apparatus 1 of the present invention is connected directly to the relay device of the valve control system. The valve control system is then operated to issue or output control signals for opening and closing each of the valves in the ACT fuel supply system 100, where possible using both of the first and second actuator motors, Motor 1 and Motor 2. The user of the apparatus conducting the test on the valve control system is able to directly observe on the display panel 11 of the apparatus 1 whether or not the LED 31 corresponding to each of the control signals to be issued by the control system is illuminated. If there is a fault in the valve control system such that a particular valve control signal is not generated or not output from the relay device, the respective LED 31 in the test apparatus 1 will not illuminate and the operator can immediately identify which valve, which actuator motor and which particular control signal (i.e. to open or to close the valve) is not detected.

Figure 5:
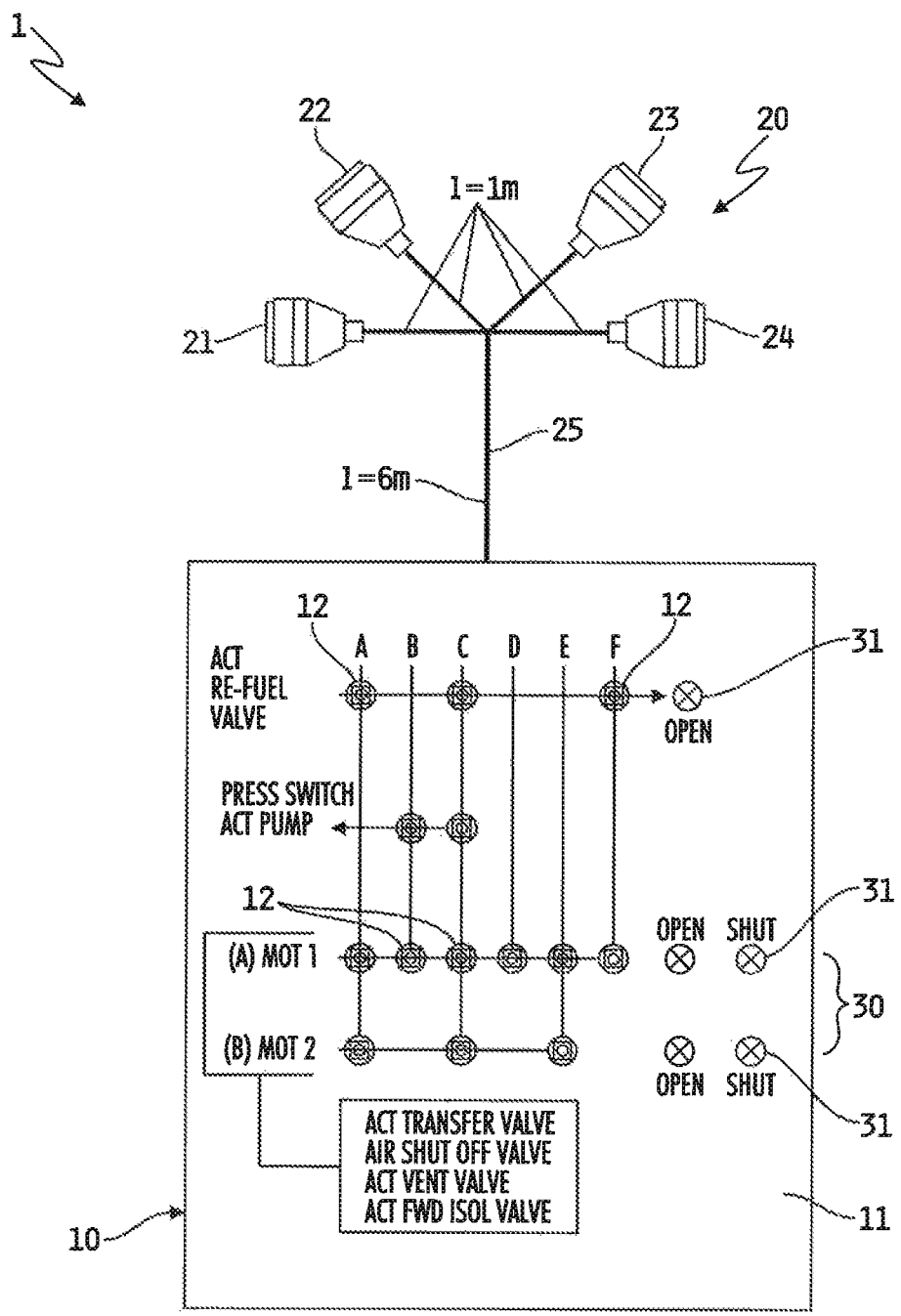
FIG. 5 is a schematic front view of a test apparatus according another embodiment of the invention.
Figure 6:
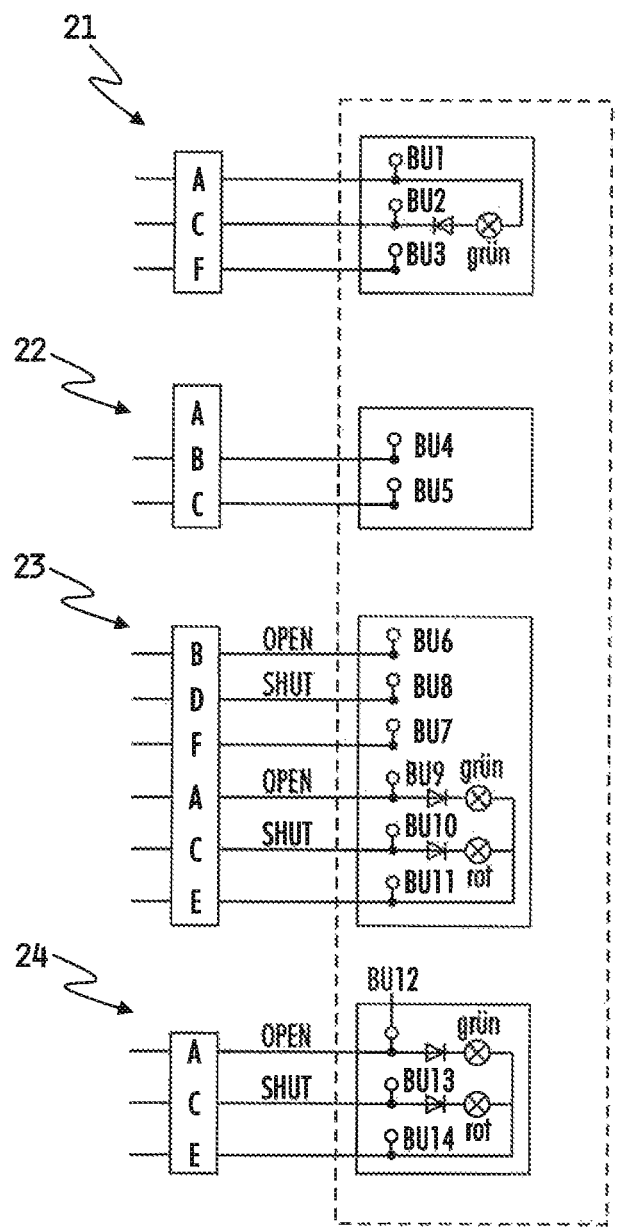
FIG. 6 is a schematic circuit diagram for the connector plugs of the test apparatus shown in FIG. 5.

With reference to FIG. 5 and FIG. 6 of the drawings, a second alternative embodiment of the apparatus 1 of the invention is illustrated. In this case, the connector means 20 that connects the apparatus with the valve control system in the fuel system 100 includes four plug-in type connecting elements 21, 22, 23, 24 in which the valve signal circuits are differently distributed. In this second embodiment, the connecting element 21 is specifically dedicated to control signals for the refuel valve, whereas the connecting element 22 is specifically dedicated to control signals for pump actuation. Both of the connecting elements 23 and 24 are adapted to receive control signals output to the ACT transfer valve 103, air shut-off valve 109, vent valve 110 and forward (FWD) isolation valve 111. In this regard, however, the connecting element 23 is specifically dedicated to receipt of control signals output to the first actuator motor (Mot 1) for those valves, whereas the connecting element 24 is specifically dedicated to receipt of control signals output to the second actuator motor (Mot 2) for those valves. Furthermore, in this embodiment, the apparatus 1 is designed for connection with the relay device of the control system at a location remote from the relay device, and the connecting elements 23 and 24 may each be connected more than once at the connection points of the separate control valves.

Another notable difference between the test apparatus 1 of this embodiment and the test apparatus illustrated in FIGS. 2 to 4 is that the second embodiment includes a collection of ports or sockets 12 formed through the front face 11 of the casing 10. These ports or sockets 12 are designed to receive a connecting probe of a measuring device, such as a voltage-, current- or Ohmmeter, for determining properties of a signal and/or a circuit through any one of the connecting elements 21-24. These ports or sockets 12 are also schematically illustrated in the circuit diagram of FIG. 6 in association with the respective connecting element and are labelled BU1 to BU14. The ability to test a signal or a circuit using these ports or sockets 12 is particular advantageous when trouble shooting to ascertain the reason for an incorrect or unexpected signal reading with the apparatus.

The above discussion of preferred embodiments of the invention is intended for illustrative purposes only. Accordingly, it will be appreciated that alterations may be made in the particular construction and arrangement of the parts shown in the drawings without departing from the scope of the invention as defined in the appended claims.

The invention claimed is:

1. A method of testing a valve control system in a fuel supply system in an aircraft, the fuel supply system having a plurality of control valves, wherein the control system includes relay means for outputting control signals to each of the plurality of control valves, each of the plurality of control valves being adapted to be operated independently by two or more actuator motors, and the relay means being adapted to output the control signals to each actuator motor of the plurality of control valves, the method comprising the steps of:

providing connector means for electrically connecting a test device to the control system relay means, connecting a test device to the relay means such that the test device is adapted to receive control signals output by the control system to any one or more of the plurality of control valves, detecting a control signal output from the relay means to one of the plurality of control valves, and identifying the particular one of the plurality of control valves to which a detected control signal is output by the relay means and/or identifying the nature of the control signal output to that particular control valve, characterized in that the connector means electrically communicates with individual circuits of the test device for receiving particular control signals for the particular valve actuator motors of the particular control valve, and in that the method further comprises the step of identifying the particular one of the actuator motors of the particular control valve to which a detected control signal is output by the relay means.

2. A method according to claim 1, wherein the step of identifying the nature of the detected control signal involves identifying whether the control signal is adapted to open or close the particular control valve.

3. A method according to claim 1, wherein the step of identifying the particular valve and/or the particular actuator motor to which a detected control signal is directed, and the step of identifying the nature of the detected control signal, include displaying information corresponding thereto for visual observation.

4. A method according to claim 1, further comprising the step of:

measuring a property of an electrical control signal output by the relay means or of a signal circuit between the relay means and one or more of the plurality of control valves.

5. An apparatus for testing a valve control system in a fuel supply system in an aircraft, the fuel supply system having a plurality of control valves, wherein the control system includes relay means for outputting control signals to each of the plurality of control valves, each of the plurality of control valves being adapted to be operated independently by two or more actuator motors, and the relay means being adapted to output the control signals to each actuator motor of the plurality of control valves, the apparatus comprising:

connector means for connection to the relay means of the control system such that the apparatus is adapted to receive control signals output by the control system to any one or more of the plurality of control valves, detector means for detecting a control signal output by the control system to one of the plurality of control valves, and indicator means for identifying to which particular one of the plurality of valves a detected control signal is output and/or for identifying the nature of the control signal output to that particular valve, characterized in that the connector means is adapted to electrically communicate with individual circuits of the apparatus for receiving particular control signals for the particular valve actuator motors of the particular control valve, and in that the indicator means is further adapted to identify the particular one of the actuator motors of the control valve to which a detected control signal is output by the relay means.

6. An apparatus according to claim 5, wherein the nature of the control signal identified by the indicator means is whether the detected control signal is adapted to open or close the particular control valve.

7. An apparatus according to claim 5, wherein the indicator means includes a visual display for identifying the particular valve and/or the particular actuator motor to which a detected control signal is output, and for identifying the nature of the detected control signal.

8. An apparatus according to claim 7, wherein the visual display comprises a plurality of light-emitting diodes, each light-emitting diode representing one of the control valves, one of the control valve actuator motors and/or an open or close control signal nature, such that each light-emitting diode, when illuminated, may clearly identify the operational characteristic of a particular control signal output by the relay means of the valve control system.

9. An apparatus according to claim 5, further comprising means for measuring a property of an electrical control signal output by the relay means or of a signal circuit.

10. An apparatus according to claim 9, wherein the measuring means comprises a port or socket for connecting a meter or measuring device to a particular control signal or control signal circuit.

11. An apparatus according to claim 5, wherein the apparatus comprises a portable, preferably hand-held, casing housing the detector means and presenting the indicator means and wherein the connector means comprises one or more connector elements for connection to the relay means of the control system, the connector elements being electrically coupled with the detector means housed in the casing via a cable.

12. An apparatus according to claim 11, wherein the connector means comprises two connector elements for connection to the relay means of the control system.

* * * * *